United States Patent [19]
Ngai

[11] Patent Number: 6,128,319
[45] Date of Patent: Oct. 3, 2000

[54] HYBRID INTERFACE FOR PACKET DATA SWITCHING

[75] Inventor: Henry P. Ngai, Coto de Caza, Calif.

[73] Assignee: Network Excellence for Enterprises Corp., Irvine, Calif.

[21] Appl. No.: 08/977,663

[22] Filed: Nov. 24, 1997

[51] Int. Cl.[7] ....................................... H04J 3/06
[52] U.S. Cl. ............................ 370/516; 375/371
[58] Field of Search .................... 370/360, 503, 370/506, 516, 518, 465; 375/354, 362, 371, 372, 373, 374, 375, 376

[56] References Cited

U.S. PATENT DOCUMENTS

| | | | |
|---|---|---|---|
| 4,564,936 | 1/1986 | Takahashi | 370/368 |
| 5,099,477 | 3/1992 | Taniguchi et al. | 370/501 |
| 5,113,395 | 5/1992 | Murakami et al. | 370/505 |
| 5,544,324 | 8/1996 | Edem et al. | 709/231 |
| 5,757,871 | 5/1998 | Furukawa et al. | 375/372 |
| 5,822,327 | 10/1998 | Satou | 370/505 |

Primary Examiner—Chi H. Pham
Assistant Examiner—Kwang B. Yao
Attorney, Agent, or Firm—Stuart T. Auvinen; G. Donald Weber, Jr.

[57] ABSTRACT

A hybrid data parallel/serial data transfer system with phase adjustment and symbol coding for switching digital data packets in order to facilitate massive high speed transfer of information with a limited number of signal lines. Much higher data transfer is possible than in a conventional serial data transfer. Multi-giga bits or Tera bits can be transferred easily over a long distance using this invention. Data transmission apparatus is described in which data is transmitted over a communication link or trunk consisting of a plurality of lines. Each message is transmitted as a sequence of groups of data bits, the bits in each group being transmitted in parallel over the trunk. Each line or path carries a signal and each message is preceded by a serial start pattern. The receiver comprises a plurality of decoders for receiving data signals from the trunk. These signals are fed to a separate buffer. The contents of the buffer are then read out in parallel. The arrangement overcomes the problem of data skew due to different transmission times over the lines of the trunk.

20 Claims, 2 Drawing Sheets

HYBRID INTERFACE FOR PACKET DATA SWITCHING

BACKGROUND

1. Field of the Invention

A hybrid data parallel/serial data transfer system, in general, and a data transfer system with phase adjustment and symbol coding for switching digital data packets in order to facilitate massive high speed transfer of information with a limited number of signal lines, in particular.

2. Prior Art

Traditionally, data transfer can take one of two forms, viz. serial or parallel. For high speed transfers, the serial stream will, typically, need to be a synchronous data stream, although asynchronous serial transfer is possible.

Conventional serial transfer, either synchronous or asynchronous, converts a byte or symbol into a single bit stream, usually with a serial clock signal included within the byte or symbol. With an embedded clock included within the data transmission, the symbol or byte can be accurately recovered. However, this process effectively results in a parallel-to-serial-to-parallel data transfer over a single signal line or path.

Conventional parallel transfer involves sending data into a parallel bus which is, typically, connected to a buffer register. After some defined delay, which allows the data line to be settled, a "Strobe" signal is then supplied to the buffer register in order to latch data into the receiving circuit or register.

Conventional high speed parallel transfer of data involves phase adjustment circuits. Each individual bit of a data transfer is fed into various delay lines to insure that the several bits arrive at the receiving data latch at the same time and that the "Strobe" arrives somewhat later with sufficient margin for the data to be reliably latched. This design limits the speed of the transfer by requiring the cycle time to be larger than the phase adjustment time of the various signal paths. Furthermore, this design requires the data signal to be valid for longer then the largest delay, which further limits the speed of the transfer.

An even higher-speed conventional parallel transfer uses synchronous transfer on each of the plurality of lines. Each line is a standard synchronous serial transfer line complete with a unique sync symbol ("SYN"). A transmitting circuit sends a byte or data to each individual line to be sent out after the initial "SYN" symbol. Thus, for N lines, N symbols are required. In addition, each line may have an uneven length depending upon whether or not the total bytes of the transmission are divisible by N. If not, some padding bytes will be needed to fill the void which represents a further waste of bandwidth.

SUMMARY OF THE INVENTION

The invention allows parallel transfer of data without the limitation imposed by the phase difference of the different signal paths. The invention converts a byte (typically 8 bits) into a 9 bit data symbol. In order to be considered valid data, the 9 bit symbol must contain at least one bit which is a "0". Each bit of a symbol is then transferred on a different signal line using a high speed data transfer. Thus, each of the data bits of the symbol is transferred independent of the others. The data bits are reassembled at the receiver. Much higher data transfer is possible than in a conventional serial data transfer. Multi-giga bit or Tera bits can easily be transferred over a long distance using this invention.

Furthermore, there is no requirement for a unique "SYN" symbol for each of the N+1 lines, making the system a lot more economical in bandwidth than the conventional design. Instead, a single, unique symbol comprising all zeroes followed by a symbol comprising all ones for a total of two symbols for N+1 lines is necessary to indicate the start of a transmission. This provides a much more economical approach for a larger number of N.

DESCRIPTION OF A PREFERRED EMBODIMENT

Figure 1:
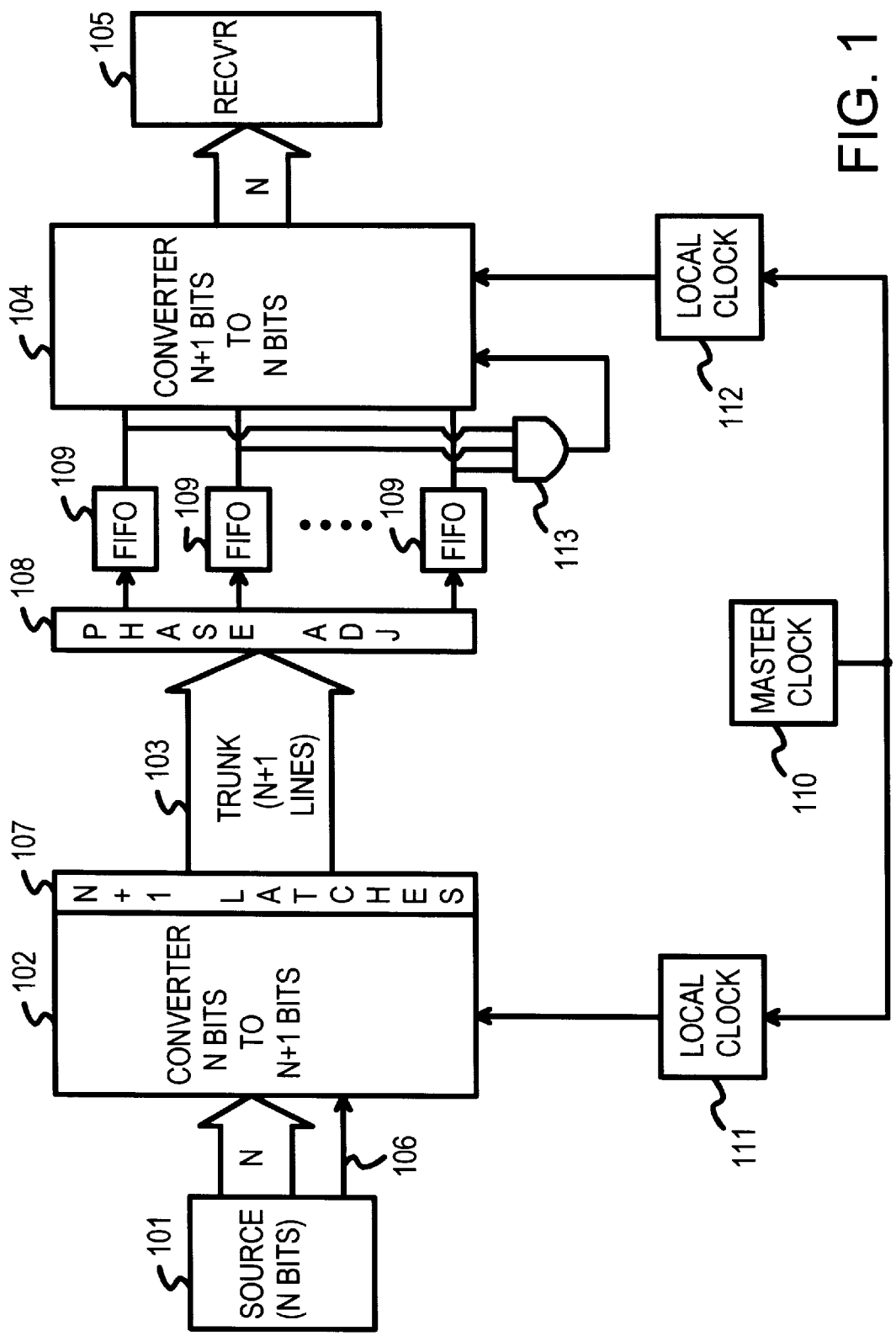
FIG. 1 is a block diagram representation of the transmission system of the instant invention.

Referring now to FIG. 1, there is shown a schematic representation of one embodiment of the interface system 100 of the instant invention.

System 100 includes any suitable source 101 which generates a signal, for example a data signal, which is conventionally referred to as a byte or symbol. The signal is comprised of a specified number of individual signals, conventionally referred to as bits. The number of bits per symbol can vary and is, for this discussion, referred to as N.

These bits can be transmitted in series or in parallel, as noted supra. However, for the purposes of this discussion, it will be assumed that the bits of a byte or symbol have been configured in parallel form for application to the converter 102. The converter 102 is constructed in a conventional manner to convert the N-bits of the input to N+1 bits at the output.

A control signal line 106 is connected between source 101 and converter 102. This line carries and transmits a control signal which selectively causes data to be transferred from source 101 to converter 102. The control signal can be generated from the source to activate the transfer to the converter, as shown by the arrow on line 106. Alternatively, the control signal can be generated from the converter 102 to activate the transfer from the source to the converter.

The converter 102 includes the capability of operating to produce a control signal wherein the converter produces certain specialized output signal groups. For example, in the "idle" status, i.e. no valid input data applied, the converter supplies binary one (or high) signals on each of the output lines. Similarly, in order to indicate the beginning of transmission of valid data, the converter produces binary zero (or low) signals followed immediately by binary one (or higher) signals on each of the output lines.

A trunk 103 or transmission line includes at least N+1 lines or paths which are connected to receive output signals from the converter 102. The trunk is, typically, any suitable signal carrier such as a metallic conductor, a fiber optic cable or any appropriate medium for carrying the output signals produced by converter 102.

The trunk 103 is connected to converter 104 which converts the N+1 signals applied thereto by the trunk 103 to N signals. Once again the construction of converter 104 is conventional in the art.

The N bit output signal produced by converter 104 is supplied to the receiver 105 which then operates on the N bit signal as desired.

For purposes of controlling the operation of the system 100, a master clock 110 is provided. This master clock produces a relatively low frequency signal, for example on the order of 10 MHz. The master clock 110 is connected to supply the clock signal to local clocks 111 and 112. In the preferred embodiment, it is contemplated that the local clocks, i.e. local clock signal source, will multiply the frequency of the clock signal produced by master clock 110. Thus, the local clock signals applied to converters 102 and 104 are each multiplied by a suitable factor M wherein M is, typically, greater than 1. This arrangement permits the local clock signals to be reasonably well synchronized throughout the system without the inherent timing problems often encountered by a high frequency signal propagated over long lines.

Each input signal line in converter 102 has an output latch 107 which is, effectively, activated by and outputs bits synchronously with the local clock signals from local clock 111. Thus, the outputting of signals by converter 102 is synchronized with the system operation.

Each signal line in trunk 103 is connected to a separate phase adjust circuit 108 which is utilized to adjust for any phase changes which may be caused in the N+1 signals due to, for example, any variance in length between (among) the several N+1 lines in trunk 103.

The phase adjust circuits 108 supply the N+1 signals to the inputs of N+1 first-in, first-out (FIFO) buffers 109. The buffers 109 store the input signals in a conventional manner.

The outputs of the FIFO buffers 109 are connected to the N+1 inputs of converter 104. In addition, the buffers 109 are connected to the inputs by suitable control logic circuitry 113 (exemplified by the AND gate). The output of the control logic 113 is also supplied to the converter 104 when all of the buffers 109 are synchronized for signal output. Thus, the signals supplied to the converter 104 are synchronized with the input signals (from converter 102) in terms of time and phase with a minimum of hardware or software control.

Moreover, each of the trunk lines and associated phase adjust circuit 109 and buffer 109 is responsible for a separate bit stream. The bit streams are put together to receive the transmitted data symbol in parallel format. When each FIFO 109 has valid data, a single symbol is recovered by the converter 104 at the receiving end of the transmission system.

Since there is virtually no limitation due to phase or timing adjustment, the parallel data transfer can take place in a very high speed manner making it possible to transfer data with high speed when the data path is made N+1 bits wide.

The symbol conversion process is a significant part of this invention. By requiring at least one zero in each valid data transfer, an all "1" symbol can be placed at the end of a transfer to signal "end of transfer".

Another significant aspect of this invention is the use of a unique symbol in the parallel domain instead of the serial domain. Doing so limits the number of symbols to two, i.e. an all "0" symbol and an all "1" symbol required for any number of N lines. Conversely, the conventional high speed hybrid transfer technique in the prior art uses N number of symbols, one for each line.

As noted, the system of the invention allows for high speed data packet transfer. That is, using conventional serial transfer, a phase lock loop, or PLL, circuit is needed to recover the clock from each data stream. Because time is required for the PLL to become in sync before data can be retrieved, a significant amount of bandwidth is wasted in such prior art designs.

Conventional higher-speed transfer system using synchronous transfer requires a unique symbol at the beginning of each packet, as well as special packets to ensure PLL synchronization for each line. Thus, for an N line system, N such symbols will be necessary. Contrariwise, the system of this invention only uses two symbols, viz. an all "0" symbol and an all "1" symbol, for each packet, regardless of the number of lines.

In the inventive system, both the transmitter and the receiver use the same master clock, which is used to generate a much higher frequency for each of the local clocks, i.e. transmission and recovery clocks. Since both local clocks are in sync, only a phase adjustment circuit may be necessary to recover the data. Such a phase adjustment circuit requires much less time to recover the data, thus making it possible for high speed packet exchanges among different source and destination pairs using a high speed analog switch without devoting much bandwidth on the PLL circuit.

Figure 2:
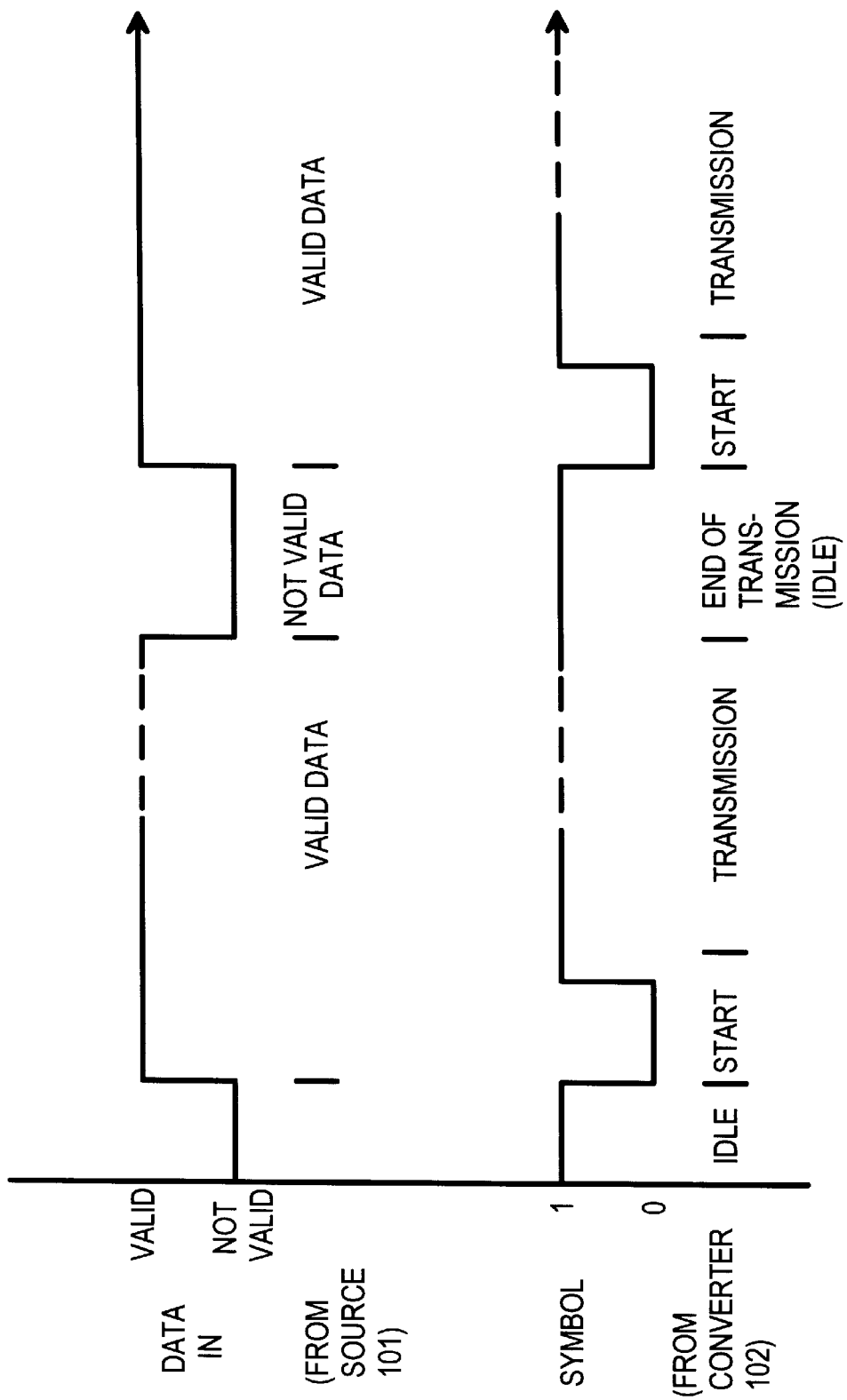
FIG. 2 is a graphical representation of the operation of the system of the instant invention.

Referring now to FIG. 2, there is shown a graphical representation of system operation. The following protocol is used on the signal bus described supra. The output from the source 101 is shown as either Valid Data or Not Valid Data. The actual data is not represented by the data line 201. The specific data being transmitted is not depicted.

Likewise, the symbol supplied by the converter 102 and represented by line 202 is shown as all "1's" or all "0's" during the transitional transmissions. The actual symbol to be transmitted over trunk line 103 is represented by the line 202. Again, the specific symbol is not depicted. (The dashed line portions of lines 201 and 202 are merely indicative of an unspecified signal length and are not intended to be limitative of the invention.)

1. Idle State. In the absence of valid data on line 201 for transmission, all output lines from converter 102 are high, i.e. a binary 1, on line 202 for at least one cycle.

2. Start of Transmission. When valid data is presented by source 101 on line 201, all lines from converter 102 go low, i.e. a binary 0, for one cycle, then high, i.e. a binary 1, for one cycle, as shown on line 202. This operation is controlled by internal logic circuitry within the converter 102.

3. Following Start of Transmission. Valid data symbol, i.e. a unique symbol containing at least one zero therein which correlates to exactly one single data group, i.e. a byte, is clocked out to the trunk line 103, as represented by line 202.

4. Go to Idle state. When data transmission is completed (i.e. valid data is no longer being transmitted as shown by line 201), all output lines from converter 102 go high for at least two cycles, as shown by line 202, and the protocol is ready to be repeated.

Line coding on each signal line is not necessary thereby minimizing overhead. As can be seen from the above description, a data packet can be transmitted with only 3 cycles of overhead. Compared to conventional serial data transmission using PLL, this system represents a huge savings.

Thus, there is shown and described a unique design and concept of a hybrid data parallel/serial data transfer system which facilitates high speed transfer of information. The particular configuration shown and described herein relates to a system with phase adjustment and symbol coding for switching digital packets. While this description is directed to a particular embodiment, it is understood that those skilled in the art may conceive modifications and/or variations to the specific embodiments shown and described herein. Any such modifications or variations which fall within the purview of this description are intended to be included therein as well. It is understood that the description herein is intended to be illustrative only and is not intended to be limitative. Rather, the scope of the invention described herein is limited only by the claims appended hereto.

What is claimed is:

1. A data transmission system including,
a first converter means for converting N input signals into N+1 output signals,
second converter means for converting N+1 input signals into N output signals,
said second converter means connected to receive the N+1 output signals from said first converter means;
a master clock signal generator for generating a master clock signal at a clock frequency,
a first local clock signal generator connected to receive said master clock signal from said master clock signal generator and supplying a first local clock signal to said first converter means at M times said clock frequency; and
a second local clock signal generator connected to receive said master clock signal from said master clock signal generator and supplying a second local clock signal to said second converter means at M times said clock frequency.

2. The system recited in claim 1 including,
source means connected to supply N input signals to said first converter means.

3. The system recited in claim 1 including,
receiver means connected to receive N output signals from said second converter means.

4. The system recited in claim 1 including,
trunk means between said first and second converter means to transfer N+1 signals therebetween.

5. The system recited in claim 1 including,
phase adjusting circuitry connected to receive the N+1 input signals and adjust any phase differences therebetween prior to supplying the signals to said second converter means.

6. The system recited in claim 5 including,
buffer circuitry connected to said phase adjusting circuitry to store the N+1 input signals after phase adjustment and prior to supplying the signals to said second converter means.

7. The system recited in claim 1 including,
logic circuitry connected to said buffer circuitry to control the supplying of the signals to said second converter means.

8. The system recited in claim 6 wherein the buffer circuitry includes:
N+1 first-in-first-out FIFO buffers, each of the N+1 FIFO buffers for storing data from a different one of the N+1 input signals.

9. The system recited in claim 8 including,
logic circuitry connected to said buffer circuitry to control supplying of the signals to said second converter means;
wherein outputs of the N+1 FIFO buffers are input to the logic circuitry and input to the second converter means.

10. The system recited in claim 9 wherein:
the logic circuitry is an AND gate, wherein the logic circuitry controls supplying of the signals to the second converter means when all outputs from the N+1 FIFO buffers are in a high state.

11. The system recited in claim 10 wherein:
the second converter means is synchronized to data from the N+1 FIFO buffers by an all-ones symbol transmitted from the first converter means, the all-ones symbol being a parallel data word having all N+1 bits in the high state.

12. The system recited in claim 11 wherein:
the all-ones symbol is a parallel symbol that synchronizes all N+1 output signals, wherein separate symbols on each of the N+1 output signals are not used for synchronization.

13. The system recited in claim 9 wherein:
synchronization symbols transmitted over the N+1 output signals are symbols in a parallel domain.

14. The system recited in claim 9 including,
N+1 trunk lines, connected between the first converter means and the phase adjusting circuitry, for carrying the N+1 output signals in parallel over separate signal lines in the N+1 trunk lines.

15. The system recited in claim 14 wherein:
the N+1 trunk lines have different delays, causing skews among signals in the N+1 output signals, wherein the phase adjusting circuitry adjusts for the skews.

16. A hybrid parallel/serial data transfer system comprising:
a first converter, receiving an input data word of N bits in parallel, for converting the input data word into a symbol of N+1 bits;
N+1 trunk lines for transmitting the symbol of N+1 bits;
phase adjustors, receiving the symbol of N+1 bits transmitted over the N+1 trunk lines, for adjusting timing of the N+1 bits within the symbol;
N+1 buffers, coupled to receive N+1 bits from the phase adjustors, for independently buffering N+1 bit streams; and
a second converter, receiving N+1 outputs from the N+1 buffers, for converting the symbol of N+1 bits to an output data word of N bits,
whereby parallel symbols are transmitted over the N+1 trunk lines, but timing of bits within the symbol is adjusted.

17. The hybrid parallel/serial data transfer system of claim 16 further comprising:
a sync symbol detector, receiving outputs from the N+1 buffers, for detecting a unique symbol pattern of the N+1 bits, the unique symbol pattern not representing any input data word of N bits, the sync symbol detector triggering the second converter when the unique symbol pattern is detected.

18. The hybrid parallel/serial data transfer system of claim 17 wherein the N+1 buffers are first-in-first-out FIFO buffers, separately buffering different bits of the N+1 trunk lines.

19. The hybrid parallel/serial data transfer system of claim 18 wherein the unique symbol pattern includes a pattern of all zero bits a pattern of all one bits.

20. The hybrid parallel/serial data transfer system of claim 18 further comprising:
a master clock generator for generating a master clock;
a first clock multiplier, receiving the master clock, for generating a first clock having a first frequency being a multiple of a frequency of the master clock, the first clock for timing transmission of the symbol of N+1 bits from the first converter;
a second clock multiplier, receiving the master clock, for generating a second clock having a second frequency being a multiple of a frequency of the master clock, the second clock for timing reception of the symbol of N+1 bits to the second converter.

* * * * *